Figure 1:
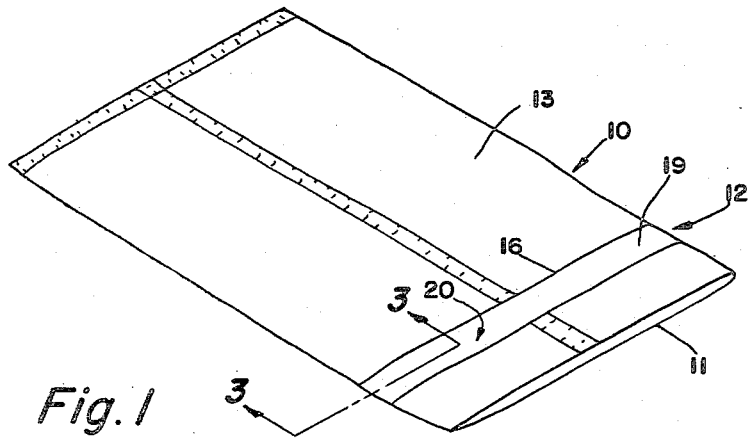

INVENTORS
LESTER R. DICKARD
ROBERT G. HAMILTON

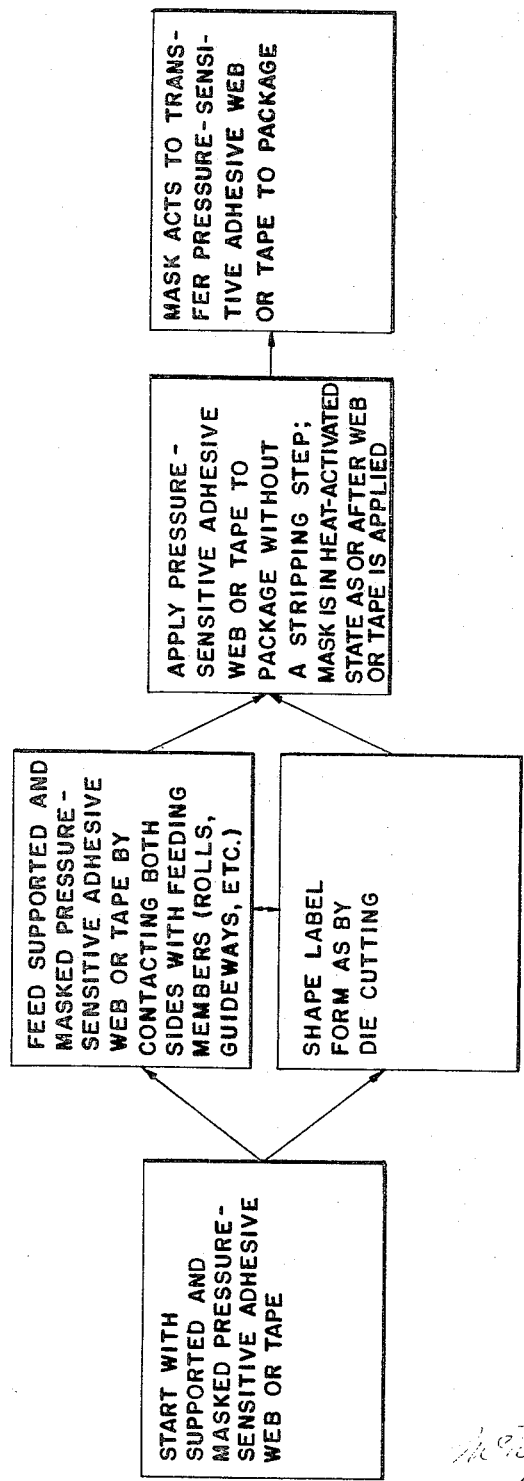

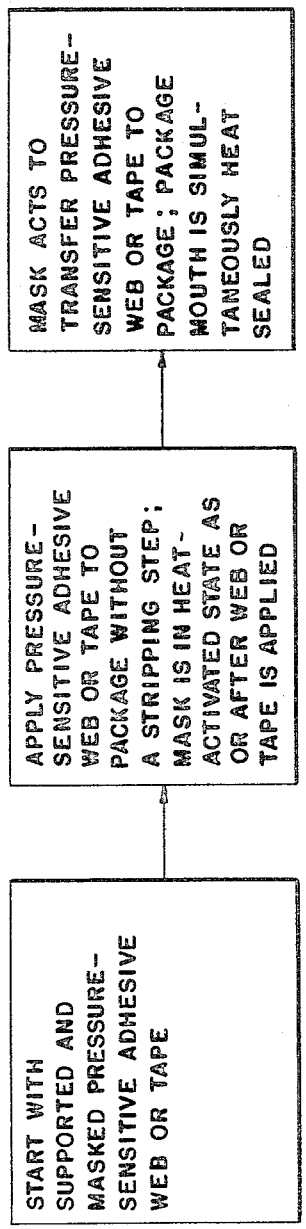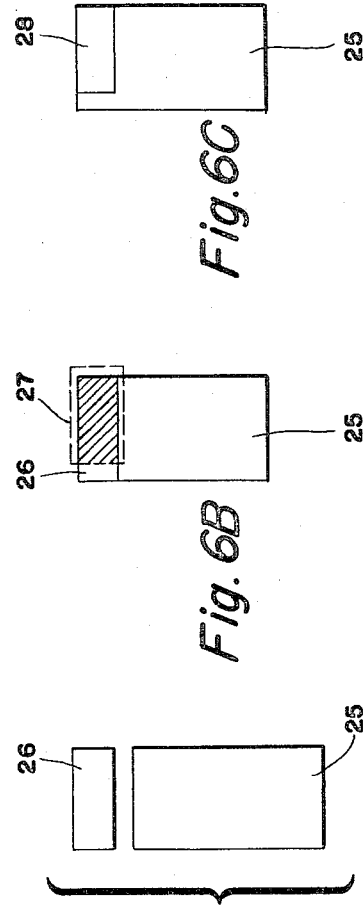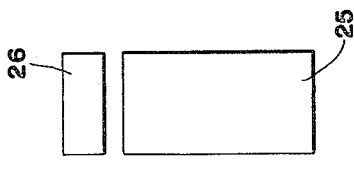

United States Patent Office 3,313,471
Patented Apr. 11, 1967

3,313,471
RECLOSABLE OR WALL HANGING
CONTAINER
Lester R. Dickard, Painesville, and Robert G. Hamilton,
Mentor, Ohio, assignors to Avery Products Corporation, San Marino, Calif., a corporation of California
Original application Aug. 25, 1964, Ser. No. 391,973.
Divided and this application May 14, 1965, Ser. No.
463,430
5 Claims. (Cl. 229—62)

This application is a divisional application with respect to our copending application Ser. No. 391,973, filed Aug. 25, 1964.

This invention relates to a packaging method and to a novel reclosable or wall-hanging package.

It is old to provide transfer tapes, in roll or sheet form, that may be employed by label manufacturers, or printers, or packagers, who do not have the facilities to compound pressure-sensitive adhesives or to coat such adhesives onto label stock or onto other bases that are to be pressure-sensitized. Rolls usually compare favorably with sheets in cost of transporting and handling. Rolls may be self wound or they may be provided with a secondary backing. Self wound rolls are usually superior from a cost standpoint.

Generally however conventional rolls cannot be die cut or otherwise formed into label shapes by the label manufacturer or printer, or by the packager, when the rolls are provided in self wound form, because the cutting station quickly becomes fouled by the exposed pressure-sensitive adhesive. When such rolls of transfer tape are not self wound but are provided with a secondary protective backing, they cannot be cut and then transferred with their primary protective backing to a package wall without stripping the secondary backing. This is a complicated manipulative step that does not lend itself to high speed or mass production packaging operations.

Self-wound transfer tapes save the cost of an extra or secondary protective backing. However their primary protective backing cannot be satisfactorily printed when unwound because the side of such backing that is not directly associated with the adhesive as a support must be readily releasable from the backing—and ready releasability (as by provision of a release coating) is not compatible with good printability. Accordingly, a packager or label printer cannot satisfactorily print label designs on the backing of transfer tapes that have been self wound.

Transfer tapes are not compatible with standard packaging lines and processes employing heat sealing. The transfer tapes cannot be engaged on both sides after the secondary protective backing is stripped or the self wound tape is unwound to expose the sticky pressure-sensitive adhesive. However such engagement on both sides is generally necessary to guide the tape, or labels formed therefrom, to the heat sealing head or station.

For such reasons, transfer tapes have not been widely employed by packagers, and pressure-sensitive package closures or reclosures have not been provided by packagers in many applications where such provision is desirable. Use of transfer tapes has generally been limited to web converting or combining operations where sheet or roll stock for manufacturing labels and displays is rendered pressure-sensitive by being combined with the transfer tape. The pressure-sensitive adhesive tape, which forms one layer of the over-all transfer tape, bonds to the label stock more strongly than to its own protective backing, and thereby transfers.

An object of the present invention is to broaden applications for pre-coated pressure-sensitive adhesive products, and to create new markets where conventional transfer tape is unsuitable. Another object is to provide methods of manufacturing reclosable or wall hanging packages having removable labels that cover areas of pressure-sensitive adhesive, the pressure-sensitive adhesive being permanently associated with the package wall, so that a flap or mouth of the package or other closure of the package may be resealed or so that the package may be displayed or stored by being wall-hung in otherwise unused space, as for example in a point-of-sale display, or by a consumer on the side wall of a refrigerator compartment, or on the inner side of the refrigerator door. Another object of the invention is to provide improved packages. Reclosure presently appears to be the most significant functional feature.

Figure 2:
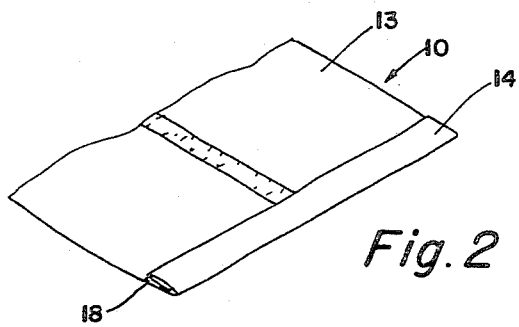
Figure 3:
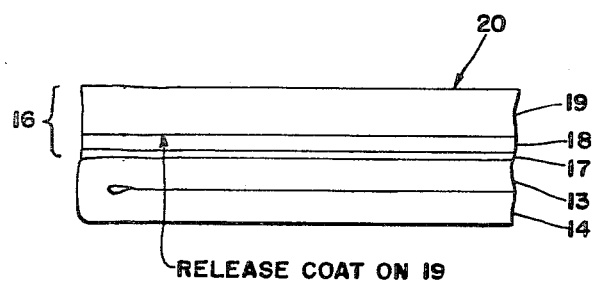

In the drawings, FIGURE 1 shows a sealed flexible package embodying the present invention in one of its aspects. FIGURE 2 shows the package of FIGURE 1 after it has been opened and reclosed. FIGURE 3 is an enlarged fragmentary section taken on line 3—3 in FIGURE 1. FIGURES 4 and 5 are schematic drawings illustrating packaging or labeling steps contemplated by the invention. FIGURES 6A, 6B and 6C are diagrammatic views illustrating a manufacturing sequence contemplated by the invention.

According to the invention in some of its important aspects, there is provided a pressure-sensitive adhesive web or tape that is covered with a mask of tackless heat-activated adhesive and that is supported by a temporary base that eventually becomes the protective backing or cover for the pressure-sensitive adhesive when it is in final supported position on a package.

As used herein, the terms "pressure-sensitive adhesive" and "heat-activated adhesive" mean, respectively, adhesives such that the first is tacky upon the application of pressure without its tackiness being essentially dependent upon temperature elevation, while the second becomes tacky only upon temperature elevation and, prior to temperature elevation, is substantially non-tacky or far less tacky than the pressure-sensitive adhesive. The heat-activated adhesive is initially tackless at ordinary room temperature, while the pressure-sensitive adhesive is quite tacky at room temperatures. These differing characteristics of the two adhesives make the adhesives readily distinguishable from each other irrespective of their particular formulations. However by way of example only, the following may be employed:

Examples of heat-activated adhesive:

*Example I*

| | Parts by weight |
|---|---|
| Gelva V-7 (polyvinyl acetate) (Shawinigan Resins Corp., Springfield, Mass.) | 80 |
| Santicizer 160 (Monsanto) | 20 |
| Hoechst Wax W (Farbwerke Hochstag, Frankfurt) | 20 |
| Acetone | 500 |

*Example II*

| | Parts by weight |
|---|---|
| Butvar B-76 (polyvinyl butyral) (Shawinigan) | 60 |
| Santicizer 141 (Monsanto) | 10 |
| Resin 861 (Hercules) | 100 |
| Armid HT (Armour Chemical Division, Armour & Co.) | 2 |
| Castorwax (Baker Castor Oil Co., New York, New York) | 100 |
| Ethanol | 600 |
| Toluene | 400 |

Example III

| | |
|---|---|
| Nitrocellulouse (½ sec. SS) | 56 |
| Dibutyl phthalate | 13 |
| Dicyclohexyl phthalate | 20 |
| Dammar wax (O. G. Inens Corp., New York, New York | 8 |
| Paraffin wax | 3 |
| Ethanol | 50 |
| Ethyl acetate | 104 |
| Toluene | 50 |

Examples of pressure-sensitive adhesive:

Example I

| | Parts by weight |
|---|---|
| Polyisobutylene polymer (high molecular weight) | 100 |
| Polyisobutylene (viscous liquid) | 70 |
| Hexane | 100 |

Example II

| | |
|---|---|
| Polyvinyl ethyl ether | 100 |
| Hydrogenated rosin | 30 |
| Polyethylene glycol dirincinoleate | 20 |
| Hexane | 100 |

Example III

| | |
|---|---|
| Butadiene styrene copolymer (70–30 ratio) | 100 |
| Ester of hydrogenated rosin | 30 |
| Petroleum oil | 50 |
| Phenyl-alpha-napthylamine | 2 |
| Hexane | 100 |

Shown in FIGURE 1 is a bag 10 formed of cellophane or other heat sealing material. The mouth 11 of the bag 10 is sealed by a heat seal extending transversely across the bag at 12. The heat seal releasably seals together the front and back walls 13 and 14 (FIGURE 3).

Extending transversely across the bag 10 above the line of heat seal for the mouth is a label 16. A heat-activated adhesive layer or web 17 is bonded to the front wall 13 of the bag 10. A pressure-sensitive adhesive layer or web 18 is bonded to the heat-activated adhesive 17. A releasable cover sheet 19 is on the pressure-sensitive adhesive layer of web 18 in protective association therewith. The other face 20 of the cover 19 is decorated with words or a design appropriate to the particular packaging application. The cover 19 may be peeled off, as more fully discussed below. This exposes the pressure-sensitive adhesive 18. After the bag mouth is opened by pulling apart the walls 13 and 14 to part the heat seal, it may be reclosed by folding the open end of the bag over twice and pressing it against the pressure-sensitive adhesive 18, as shown in FIGURE 2.

The adhesive layer 18 is a coating originally applied to the sheet 19 by solvent coating techniques or in any other feasible manner. The layer 17 is a coating originally applied over the coating 18 after the latter has been heat cured. Typical dry thicknesses of the coatings 18 and 17 are 1 mil and ½ mil respectively.

When the cover 19 is peeled back, it releases from the layer 18. Both the bond between the layers 18 and 17 and the cohesiveness of layer 18 should be stronger than the bond between 18 and 19.

These relationships may be accomplished by the formulations given above and use of an appropriate release coating if necessary on the adhesive coated surface of 19 prior to coating with the pressure-sensitive adhesive 18. It is to be understood that other adhesive combinations can be employed to give the relationships called for. The pressure-sensitive adhesives may comprise in general materials prepared from butadiene-styrene copolymers or from natural rubber with varying proportions of natural or synthetic resins, mineral fillers, plasticizers, antioxidants and other additives, or vinyl polymers or polymers of methacrylic acid esters or other acrylic acid esters may be used. The polymer or rubber influences parting properties and imparts cohesiveness and strength to the adhesive. The adhesiveness may be determined by proportioning of tackifiers known to possess fairly specific wetting power, or particular polymers or resins may be selected, or the resin proportions may be varied. Dehydrogenated and hydrogenated rosin, polyvinyl ethers, pine tar and methyl esters of hydrogenated rosin, terepene polymers, and hydrogenated coumarone-indene resins may be used. Generally, the higher the proportion of tackifier to polymer, the higher the adherence. For all presently considered fibrous covers such as paper, and for many non-fibrous covers, the pressure-sensitive adhesives given above will release from the heat-activated adhesives given above more readily than they will release from the cover, unless the adhesion across the interface between the pressure-sensitive adhesive and the cover is reduced, as by application of a release coating, or by other measures, such as providing the cover in creped form. However application of a release coating on the cover 19, or other measures such as provision of a creped cover, may be eliminated if the specific adhesion of the pressure-sensitive adhesive to the particular cover (say a slippery film material) is less than the specific adhesion of the pressure-sensitive material to the heat-activated adhesive. If a release coating is employed, it may be a silicone polymer composition as described in U.S. Patent 2,985,554 to Lester R. Dickard starting at column 1, line 73 therein, and continuing to column 3, line 10, or any suitable commercially available release coating material may be employed, such as Dow-Corning "Syl-off 22." These coatings may be solvent coated and heat cured as described in the foregoing patent or as described in sales literature in the case of commercially available coatings. If a release coating is employed, it is generally thin in dimension as compared to the other coatings. A release coating on the upper face of the cover 19 might be say ¼ mil in thickness.

The illustrated package may be manufactured according to procedures schematically shown in FIGURES 4 and 5. The starting material for the label 16 may be a web or tape of pressure-sensitive adhesive 18 supported on a base that eventually becomes the cover sheet 19. The pressure-sensitive adhesive is masked by a layer of the tackless heat-activated adhesive 17.

This starting combination may be provided in roll or sheet form. If provided in roll form it may be die cut by a label maker or packager without fouling the cutting station with pressure-sensitive adhesive, since the pressure-sensitive adhesive 18 is covered or masked by the tackless heat-activated adhesive 17. The supported and masked pressure-sensitive adhesive that constitutes the starting material may also be fed by being contacted on both sides with feeding members such as rolls or guideways and the like. The sealing and die-cutting steps may be performed in any order or they may be repeated or one may be eliminated, all as schematically indicated in FIGURE 4. FIGURE 5 illustrates a sequence in which both of the last-mentioned steps are omitted. In many applications it is not feasible to omit the step of feeding or transporting the supported and masked pressure-sensitive adhesive by contacting both sides with feeding members. Nevertheless such an omission is illustrated to demonstrate other novel aspects of the invention, such as the sequence of steps illustrated in FIGURE 5 in which the last step comprises transfer of the pressure-sensitive adhesive and simultaneous heat sealing of the packaging mouth.

In both the FIGURE 4 and FIGURE 5 illustrations, the supported and masked pressure-sensitive adhesive web or tape is applied to the package without a stripping step. The mask 17 is in a heat-activated state as or after the web or tape is applied, and when the mask in its activated state is in contact with the package it bonds to the package and thereby effects a transfer to the package of the pressure-sensitive adhesive web or tape so that it becomes more strongly bonded to the package than to its original support (cover sheet 19). However the cover sheet remains affixed to the pressure-sensitive adhesive for the time being, and now functions as a cover rather than as a base for the pressure-sensitive adhesive.

Some heat-activated adhesives remain tacky for a time following initial heat activation (see U.S. Patent 2,462,-029), and these may be employed as the mask 17 and may be activated prior to application of the web or tape to the package, or mask 17 may comprise any suitable heat-activated adhesive that is activated just prior to application, so long as it remains sufficiently tacky to effect the transfer at actual application. In a typical heat-sealing type of operation, the mask 17 is activated by heat just as or just after the web or tape, of which it forms a part, is applied to the package, heat applications being accomplished by contacting the web or tape with a hot member that presses the web or tape against the package.

If the web combination that is applied to the package has not been previously severed from a continuous tape form, it may be severed after the performance of all the steps described above.

When desired, according to the invention, pre-coated and pre-cured pressure-sensitive adhesives may be used to provide or "develop" pressure-sensitive adhesive areas of desired special configurations on a package surface or on any other surface, as diagrammatically illustrated in FIGURES 6A, 6B and 6C. FIGURE 6A shows a surface 25 which may be the wall of a package, or which may be any other surface on which it is desired to provide the pressure-sensitive adhesive area 28 (FIGURE 6C). The web combination or label 26, which may be similar or identical to the label 16, is provided as indicated in FIGURE 6A. The label 26 is positioned on the surface 25 as indicated in FIGURE 6B. A heat applying member 27 applies heat to the heat-activated adhesive layer or mask of the label 26. This mask corresponds to the mask 17 of the label 16. The area of such mask to which heat is applied is less than the area of the pressure-sensitive adhesive web or layer that forms part of the label 26, and such lesser area is illustrated in cross-hatching in FIGURE 6B. This lesser area corresponds to the desired adhesive pattern 28 indicated in FIGURE 6C. After the label 26 is combined by the heat applying step illustrated in FIGURE 6B, and the cover of the label 26 corresponding to the cover 19 of the label 16 is stripped, the adhesive pattern 28 results. The pattern 28 does not extend to the left edge of the surface 25 because in this region there has not occurred a transfer of the pressure-sensitive adhesive to the surface 25. This region provides a starting tab for removing the cover of the label 26 because, prior to stripping of the cover, the pressure-sensitive adhesive in this region is masked from the surface 25. Such adhesive is removed when the cover is removed. Other adhesive patterns more irregular than pattern 28 may be formed as determined by any special shape given to the heat-applying member that is used to effect the adhesive transfer.

As used herein the term "tape" includes long lengths or strips of material whether many inches in width or only a fraction of an inch in width.

It is obvious that various changes may be made in details of the invention without departing from the fair scope of the teaching contained in this disclosure. The invention is therefore not limited to any of these details, except insofar as the following claims are necessarily so limited.

What is claimed is:

1. A reclosable or wall-hanging package comprising a package body, a heat-activated adhesive bonded directly to said package body, a pressure-sensitive adhesive bonded directly to said heat-activated adhesive, a removable tape or label covering said pressure-sensitive adhesive, the bond between said heat-activated adhesive and both said package body and said pressure-sensitive adhesive being greater than the bond between said tape or label and said pressure-sensitive adhesive, and the cohesion of said pressure-sensitive adhesive being greater than the bond between said pressure-sensitive adhesive and said tape or label whereby removal of said tape or label exposes the surface of said pressure-sensitive adhesive remote from said heat activated adhesive with both of said adhesives remaining on said package body.

2. A device as in claim 1 in which the heat-activated adhesive and pressure-sensitive adhesive are coextensive with said removable tape or label but the area of bond between the heat-activated adhesive and the packaged body is less than the area of said tape or label, removal of said tape or label resulting in separation of said adhesives therefrom only along the area of bond between said heat-activated adhesive and the package body.

3. A device as in claim 2 in which the area of non-bond between the heat-activated adhesive and the package body intersects the edge of the tape or label to provide a starting tab for stripping the tape or label to expose the pressure-sensitive adhesive that overlies the area of bond between the heat-activated adhesive and the package body.

4. A device as in claim 1 in which said package body defines a mouth having opposed walls, said opposed walls in an area directly underlying said heat-activated adhesive being heat sealed to close said mouth.

5. A device as in claim 1 in which said package body provides opposed walls defining a mouth opening along adjacent overlying edges of said wall, and said heat-activated adhesive is bonded to the outside of one wall at a location spaced from and substantially parallel to the mouth opening.

References Cited by the Examiner
UNITED STATES PATENTS 2,030,135 2/1936 Carpenter _____ 206
2,042,692 6/1936 Wurzburg _____ 229—48
2,770,411 11/1956 MacKay _____ 229—48
3,070,280 12/1962 Richmond _____ 229—62 X
3,154,239 10/1964 Madsen _____ 229—62

JOSEPH R. LECLAIR, *Primary Examiner.*

DAVID M. BOCKENEK, *Examiner.*